(12) United States Patent
Little

(10) Patent No.: US 10,276,995 B2
(45) Date of Patent: Apr. 30, 2019

(54) ELECTRICAL ADAPTOR FOR DIFFERENT PLUG MODULE AND ELECTRICAL ASSEMBLY HAVING THE SAME

(71) Applicant: FOXCONN INTERCONNECT TECHNOLOGY LIMITED, Grand Cayman (KY)

(72) Inventor: Terrance F. Little, Fullerton, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/877,841

(22) Filed: Jan. 23, 2018

(65) Prior Publication Data

US 2018/0212385 A1 Jul. 26, 2018

Related U.S. Application Data

(60) Provisional application No. 62/449,133, filed on Jan. 23, 2017.

(51) Int. Cl.

| | |
|---|---|
| H01R 31/06 | (2006.01) |
| G02B 6/42 | (2006.01) |
| H01R 13/627 | (2006.01) |
| H01R 13/504 | (2006.01) |
| H01R 13/52 | (2006.01) |
| H01R 13/631 | (2006.01) |
| H01R 13/6581 | (2011.01) |
| H01R 13/518 | (2006.01) |
| H01R 13/633 | (2006.01) |

(52) U.S. Cl.
CPC ............ *H01R 31/06* (2013.01); *G02B 6/4269* (2013.01); *G02B 6/4284* (2013.01); *H01R 13/504* (2013.01); *H01R 13/518* (2013.01); *H01R 13/5202* (2013.01); *H01R 13/6273* (2013.01); *H01R 13/631* (2013.01); *H01R 13/6581* (2013.01); *H01R 31/065* (2013.01); *H01R 13/6335* (2013.01)

(58) Field of Classification Search
CPC ...................................................... H01R 31/06
See application file for complete search history.

(56) References Cited

U.S. PATENT DOCUMENTS 6,364,709 B1 * 4/2002 Jones ................. H01R 13/6594
439/607.2
6,368,153 B1 * 4/2002 Hwang ................ H05K 9/0058
439/607.2

(Continued)

*Primary Examiner* — Ross N Gushi
(74) *Attorney, Agent, or Firm* — Wei Te Chung; Ming Chieh Chang

(57) ABSTRACT

An electrical assembly includes a main body on which the cage assembly and the associated main receptacle connector are mounted. The cage is adapted to receive the FP5 plug module or the QSFP-28 plug module associated with an adaptor. The adaptor includes a housing unitarily formed with the heat sink structure and an intermediate receptacle connector mounted upon an intermediate board wherein the intermediate receptacle connector is adapted to receive the QSFP-28 plug module and the intermediate board is adapted to be received with the main board. The cage includes different latches respectively mutually exclusively locking the FP5 plug module and the QSFP-28 plug module.

17 Claims, 19 Drawing Sheets

(56) References Cited

U.S. PATENT DOCUMENTS

| | | | | |
|---|---|---|---|---|
| 6,416,361 B1* | 7/2002 | Hwang | H01R 13/6594 | 439/607.2 |
| 6,430,053 B1* | 8/2002 | Peterson | H01R 13/6335 | 361/728 |
| 6,443,768 B1* | 9/2002 | Dirkers | H05K 9/0058 | 439/607.2 |
| 6,478,622 B1* | 11/2002 | Hwang | H05K 9/0058 | 439/607.2 |
| 6,508,670 B1* | 1/2003 | Hwang | H01R 13/6594 | 439/607.37 |
| 6,511,345 B1* | 1/2003 | Hwang | H01R 12/707 | 439/541.5 |
| 6,524,134 B2* | 2/2003 | Flickinger | H05K 9/0058 | 439/607.2 |
| 6,558,191 B2* | 5/2003 | Bright | G02B 6/4246 | 439/541.5 |
| 6,600,865 B2* | 7/2003 | Hwang | H01R 13/659 | 385/134 |
| 6,612,868 B2* | 9/2003 | Hwang | H05K 9/0058 | 439/607.54 |
| 6,655,995 B1* | 12/2003 | Reisinger | H01R 13/6594 | 439/607.35 |
| 6,666,694 B1* | 12/2003 | Daly | H01R 12/7047 | 439/79 |
| 6,666,720 B1* | 12/2003 | Reisinger | H01R 13/6594 | 439/607.13 |
| 6,724,641 B1* | 4/2004 | Hwang | G02B 6/4277 | 361/818 |
| 6,729,905 B1* | 5/2004 | Hwang | H05K 9/0058 | 439/607.21 |
| 6,731,519 B1* | 5/2004 | Hwang | G02B 6/4277 | 174/387 |
| 6,780,053 B1* | 8/2004 | Yunker | G02B 6/4201 | 439/607.2 |
| 6,816,376 B2* | 11/2004 | Bright | G02B 6/4201 | 361/704 |
| 6,822,872 B2* | 11/2004 | Schulz | H05K 5/0013 | 361/747 |
| 6,824,429 B2* | 11/2004 | Hwang | H05K 9/0058 | 439/607.2 |
| 6,867,969 B2* | 3/2005 | Hwang | G02B 6/4277 | 165/185 |
| 6,878,872 B2* | 4/2005 | Lloyd | G02B 6/4277 | 174/384 |
| 6,893,294 B2* | 5/2005 | Moriyama | G02B 6/4201 | 439/607.2 |
| 6,926,551 B1* | 8/2005 | Schulz | H01R 13/6272 | 439/357 |
| 6,943,287 B2* | 9/2005 | Lloyd | H01R 23/6873 | 174/359 |
| 6,972,968 B2* | 12/2005 | Hwang | G02B 6/4277 | 174/383 |
| 6,980,437 B2* | 12/2005 | Bright | H04B 1/036 | 165/185 |
| 7,001,217 B2* | 2/2006 | Bright | G02B 6/4201 | 439/607.2 |
| 7,037,136 B1* | 5/2006 | Korsunsky | H01R 13/5213 | 174/16.1 |
| 7,037,137 B2* | 5/2006 | Lee | H05K 9/0058 | 439/607.06 |
| 7,044,777 B1* | 5/2006 | Daly | H01R 13/6582 | 439/540.1 |
| 7,070,446 B2* | 7/2006 | Henry | H01R 23/6873 | 439/541.5 |
| 7,179,096 B2* | 2/2007 | Dube | H01R 23/68 | 439/76.1 |
| 7,242,586 B2* | 7/2007 | Cheng | G02B 6/4201 | 361/728 |
| 7,249,966 B2* | 7/2007 | Long | H01R 13/65802 | 439/490 |
| 7,261,591 B2* | 8/2007 | Korsunsky | H01R 12/727 | 439/541 |
| 7,275,959 B2* | 10/2007 | Daly | H01R 13/6582 | 439/607.2 |
| 7,322,854 B2* | 1/2008 | Long | H05K 9/0058 | 439/607.28 |
| 7,357,673 B2* | 4/2008 | Long | H05K 9/0058 | 439/607.2 |
| 7,371,965 B2* | 5/2008 | Ice | G02B 6/4201 | 174/50 |
| 7,421,184 B2* | 9/2008 | Long | G02B 6/0001 | 385/146 |
| 7,438,596 B2* | 10/2008 | Phillips | H01R 13/6582 | 439/607.01 |
| 7,452,216 B2* | 11/2008 | Murr | H01R 13/665 | 439/74 |
| 7,455,554 B2* | 11/2008 | Long | G02B 6/4201 | 439/607.17 |
| 7,488,212 B2* | 2/2009 | Chen | G02B 6/4277 | 439/607.01 |
| 7,530,845 B1* | 5/2009 | Yang | G02B 6/4201 | 439/607.01 |
| 7,539,018 B2* | 5/2009 | Murr | H05K 7/20418 | 165/185 |
| 7,557,305 B2* | 7/2009 | Su | H01R 12/585 | 174/376 |
| 7,557,306 B2* | 7/2009 | Chen | H05K 9/0058 | 174/377 |
| 7,559,800 B2* | 7/2009 | Wu | H01R 13/6584 | 439/607.3 |
| 7,575,471 B2* | 8/2009 | Long | G02B 6/0001 | 439/541.5 |
| 7,583,510 B2* | 9/2009 | Wang | H01R 13/65802 | 361/753 |
| 7,612,299 B2* | 11/2009 | Chen | H05K 9/0058 | 174/359 |
| 7,625,223 B1* | 12/2009 | Fogg | H05K 5/0247 | 361/715 |
| 7,641,515 B1* | 1/2010 | Szczesny | H01R 13/6582 | 439/607.01 |
| 7,704,097 B1* | 4/2010 | Phillips | H01R 13/7172 | 439/607.01 |
| 7,727,018 B2* | 6/2010 | Bright | H01R 13/741 | 439/607.28 |
| 7,764,504 B2* | 7/2010 | Phillips | G02B 6/4246 | 165/80.2 |
| 7,798,820 B2* | 9/2010 | Hong | H05K 1/117 | 385/92 |
| 7,845,975 B2* | 12/2010 | Cheng | H05K 9/0058 | 439/541.5 |
| 7,869,224 B1* | 1/2011 | Yang | G02B 6/4284 | 174/350 |
| 7,871,294 B2* | 1/2011 | Long | G02B 6/0001 | 439/541.5 |
| 7,896,659 B1* | 3/2011 | Westman | H01R 13/514 | 439/108 |
| 7,934,959 B2* | 5/2011 | Rephaeli | G02B 6/4201 | 439/620.22 |
| 7,963,795 B1* | 6/2011 | Yang | G02B 6/4201 | 439/490 |
| 7,974,098 B2* | 7/2011 | Oki | G02B 6/4201 | 165/185 |
| 8,053,667 B2* | 11/2011 | Chen | H05K 9/0058 | 174/50 |
| 8,075,199 B2* | 12/2011 | Losio | H04L 49/40 | 385/92 |
| 8,105,110 B2* | 1/2012 | Hsia | H01R 23/6873 | 439/152 |
| 8,123,559 B2* | 2/2012 | Brown | G02B 6/4201 | 361/816 |
| 8,162,675 B2* | 4/2012 | Regnier | H01R 9/038 | 439/76.1 |
| 8,182,290 B2* | 5/2012 | Fonteneau | H05K 9/0058 | 439/607.21 |
| 8,182,291 B2* | 5/2012 | Tsou | H01R 43/18 | 439/607.55 |
| 8,183,470 B2* | 5/2012 | Zhang | H05K 9/0058 | 174/359 |

(56) References Cited

U.S. PATENT DOCUMENTS

| | | | | |
|---|---|---|---|---|
| 8,189,982 B2* | 5/2012 | Yang | G02B 6/4201 385/134 |
| 8,197,282 B1* | 6/2012 | Su | H01R 13/6587 439/540.1 |
| 8,200,097 B2* | 6/2012 | Cole | G02B 6/4284 398/117 |
| 8,203,084 B2* | 6/2012 | Wertz, Jr. | H01R 13/6584 174/368 |
| 8,277,252 B2* | 10/2012 | Fogg | H01R 13/6587 439/607.25 |
| 8,335,416 B2* | 12/2012 | Shirk | G02B 6/0008 385/146 |
| 8,339,784 B2* | 12/2012 | Pirillis | H01R 13/6586 361/679.5 |
| 8,342,881 B2* | 1/2013 | Lang | H01R 9/038 439/607.01 |
| 8,393,917 B2* | 3/2013 | Regnier | H05K 7/20709 439/485 |
| 8,419,212 B2* | 4/2013 | MacDougall | H01R 12/712 362/227 |
| 8,419,444 B2* | 4/2013 | Kagan | H01R 31/065 439/76.1 |
| 8,426,751 B2* | 4/2013 | Lee | H01R 13/506 174/520 |
| 8,449,312 B2* | 5/2013 | Lang | H01R 9/038 439/352 |
| 8,449,331 B2* | 5/2013 | Phillips | H01R 13/6581 439/607.21 |
| 8,460,033 B2* | 6/2013 | Regnier | H01R 9/038 439/607.13 |
| 8,465,320 B2* | 6/2013 | Long | G02B 6/0001 439/541.5 |
| 8,467,190 B2* | 6/2013 | Yi | G02B 6/4269 361/679.46 |
| 8,469,738 B2* | 6/2013 | Long | G02B 6/0001 439/541.5 |
| 8,469,744 B2* | 6/2013 | Nichols | H01R 13/518 439/607.01 |
| 8,500,490 B2* | 8/2013 | Tsou | H01R 43/18 439/607.55 |
| 8,545,267 B2* | 10/2013 | Fogg | H01R 13/6587 439/607.25 |
| 8,545,268 B2* | 10/2013 | Fogg | H01R 13/6587 439/607.25 |
| 8,613,632 B1* | 12/2013 | Nichols | H01R 13/6587 439/485 |
| 8,641,429 B2* | 2/2014 | Fish | H01R 13/6658 439/76.1 |
| 8,684,765 B2* | 4/2014 | Shirk | G02B 6/0008 362/551 |
| 8,727,793 B2* | 5/2014 | Cafiero | G02B 6/4201 439/540.1 |
| 8,740,644 B2* | 6/2014 | Long | G02B 6/0001 439/541.5 |
| 8,740,646 B2* | 6/2014 | Lang | H01R 9/038 439/607.01 |
| 8,747,159 B2* | 6/2014 | Liu | G02B 6/4261 439/607.2 |
| 8,753,145 B2* | 6/2014 | Lang | H01R 9/038 439/527 |
| 8,767,806 B2* | 7/2014 | Tang | H04L 25/03878 375/219 |
| 8,823,540 B2* | 9/2014 | Scholeno | H01R 12/716 340/815.4 |
| 8,851,929 B2* | 10/2014 | Sorani | H01R 13/6658 361/695 |
| 8,864,523 B2* | 10/2014 | Banakis | H01R 13/6585 439/607.25 |
| 8,870,595 B2* | 10/2014 | Schmitt | H01R 13/6587 439/607.25 |
| 8,879,267 B2* | 11/2014 | Henry | H04L 12/6418 165/104.33 |
| 8,885,342 B2* | 11/2014 | Skepnek | H01L 23/367 174/548 |
| 8,890,004 B2* | 11/2014 | Wickes | H05K 9/0009 174/354 |
| 8,894,438 B2* | 11/2014 | Schmitt | H01R 13/659 439/540.1 |
| 8,992,254 B2* | 3/2015 | Banakis | H01R 12/721 439/607.23 |
| 9,011,177 B2 | 4/2015 | Molex | |
| 9,035,199 B2* | 5/2015 | Janota | H05K 9/0007 174/355 |
| 9,112,314 B2* | 8/2015 | Khazen | H01R 13/65802 |
| 9,124,025 B2* | 9/2015 | Xue | G02B 6/4261 |
| 9,142,910 B2* | 9/2015 | Yu | H01R 13/11 |
| 9,142,922 B2* | 9/2015 | Regnier | H01R 13/65802 |
| 9,246,252 B2* | 1/2016 | Kachlic | H01R 12/71 |
| 9,252,538 B2* | 2/2016 | Recce | H01R 13/641 |
| 9,252,544 B2* | 2/2016 | Yang | H01R 13/745 |
| 9,568,690 B2* | 2/2017 | Ista | G02B 6/3807 |
| 9,793,667 B1* | 10/2017 | Park | H04B 1/38 |
| 9,965,433 B2* | 5/2018 | Tomada | G06F 13/4282 |
| 2002/0025720 A1* | 2/2002 | Bright | G02B 6/4246 439/541.5 |
| 2002/0131122 A1* | 9/2002 | Anderl | H04B 10/806 398/135 |
| 2002/0145856 A1* | 10/2002 | Jones | H01R 13/6594 361/752 |
| 2002/0197043 A1* | 12/2002 | Hwang | H01R 13/659 385/134 |
| 2003/0141090 A1* | 7/2003 | Kruger | G02B 6/4201 174/50 |
| 2003/0169581 A1* | 9/2003 | Bright | G02B 6/4201 361/816 |
| 2003/0236019 A1* | 12/2003 | Hanley | G02B 6/4292 439/372 |
| 2004/0075993 A1* | 4/2004 | Hwang | G02B 6/4277 361/818 |
| 2004/0077217 A1* | 4/2004 | Hwang | H05K 9/0058 439/607.2 |
| 2004/0097136 A1* | 5/2004 | Flickinger | H05K 9/0058 439/607.01 |
| 2004/0110406 A1* | 6/2004 | Phillips | H01R 13/62933 439/352 |
| 2004/0203289 A1* | 10/2004 | Ice | G02B 6/4277 439/607.2 |
| 2005/0037655 A1* | 2/2005 | Henry | H01R 23/6873 439/341 |
| 2005/0208831 A1* | 9/2005 | Lee | H05K 9/0058 439/607.06 |
| 2005/0226571 A1* | 10/2005 | Malagrino, Jr. | G02B 6/4201 385/92 |
| 2005/0254257 A1* | 11/2005 | Long | G02B 6/0001 362/581 |
| 2005/0254772 A1* | 11/2005 | Long | G02B 6/0008 385/146 |
| 2005/0255726 A1* | 11/2005 | Long | G02B 6/0001 439/80 |
| 2006/0003628 A1* | 1/2006 | Long | H01R 12/716 439/541.5 |
| 2006/0003632 A1* | 1/2006 | Long | H05K 9/0058 439/607.2 |
| 2006/0252311 A1* | 11/2006 | Togami | G02B 6/4277 439/607.2 |
| 2006/0281357 A1* | 12/2006 | Chen | G02B 6/4201 439/350 |
| 2006/0285806 A1* | 12/2006 | Ahrens | G02B 6/4246 385/92 |
| 2006/0291785 A1* | 12/2006 | Epitaux | H04B 10/40 385/92 |
| 2007/0066137 A1* | 3/2007 | Yang | H01R 43/18 439/607.01 |
| 2007/0128936 A1* | 6/2007 | Long | H05K 9/0058 439/607.28 |
| 2007/0128937 A1* | 6/2007 | Long | H05K 9/0016 439/607.01 |

(56) References Cited

U.S. PATENT DOCUMENTS

| | | | | |
|---|---|---|---|---|
| 2007/0183128 A1* | 8/2007 | Pirillis | H05K 7/20418 | 361/715 |
| 2007/0212942 A1* | 9/2007 | Long | G02B 6/4201 | 439/607.17 |
| 2007/0243741 A1* | 10/2007 | Yang | H01R 13/4364 | 439/304 |
| 2007/0253168 A1* | 11/2007 | Miller | G02B 6/4246 | 361/719 |
| 2007/0272041 A1* | 11/2007 | Bench | G02B 6/4201 | 73/865.6 |
| 2008/0019100 A1* | 1/2008 | Yang | H05K 9/0058 | 361/716 |
| 2008/0020640 A1* | 1/2008 | Zhang | H01R 23/6873 | 439/607.01 |
| 2008/0047746 A1* | 2/2008 | Chen | H05K 9/0058 | 174/369 |
| 2008/0102699 A1* | 5/2008 | Chen | G02B 6/4277 | 439/607.01 |
| 2008/0233799 A1* | 9/2008 | Winker | G02B 6/4201 | 439/607.01 |
| 2008/0299826 A1* | 12/2008 | Cheng | H05K 9/0058 | 439/607.01 |
| 2009/0016685 A1* | 1/2009 | Hudgins | H04B 10/40 | 385/92 |
| 2009/0098767 A1* | 4/2009 | Long | G02B 6/0001 | 439/541.5 |
| 2009/0116185 A1* | 5/2009 | Su | G02B 6/4201 | 361/688 |
| 2009/0176409 A1* | 7/2009 | Oki | H01R 13/6582 | 439/607.2 |
| 2009/0257754 A1* | 10/2009 | Theodoras, II | H04L 49/30 | 398/135 |
| 2010/0111476 A1* | 5/2010 | Shirk | G02B 6/0008 | 385/53 |
| 2010/0151733 A1* | 6/2010 | Tsou | H01R 43/18 | 439/607.55 |
| 2010/0254112 A1* | 10/2010 | Brown | G02B 6/4201 | 361/818 |
| 2010/0303465 A1* | 12/2010 | Dahlfort | G02B 6/4201 | 398/115 |
| 2011/0031860 A1* | 2/2011 | Yang | H01R 13/518 | 312/352 |
| 2011/0053415 A1* | 3/2011 | Fonteneau | H05K 9/0058 | 439/607.01 |
| 2011/0059625 A1* | 3/2011 | Westman | H01R 13/514 | 439/55 |
| 2011/0081807 A1* | 4/2011 | Rephaeli | G02B 6/4201 | 439/620.21 |
| 2011/0223805 A1* | 9/2011 | Regnier | H01R 9/038 | 439/607.01 |
| 2011/0300757 A1* | 12/2011 | Regnier | H01R 29/00 | 439/626 |
| 2011/0300761 A1* | 12/2011 | Wang | H01R 31/005 | 439/638 |
| 2011/0317964 A1* | 12/2011 | Downs | G02B 6/4201 | 385/92 |
| 2012/0058670 A1* | 3/2012 | Regnier | H01R 13/65802 | 439/485 |
| 2012/0071011 A1* | 3/2012 | Kagan | H01R 31/065 | 439/76.1 |
| 2012/0083156 A1* | 4/2012 | Fogg | H01R 13/6477 | 439/607.25 |
| 2012/0155108 A1* | 6/2012 | Scholeno | H01R 12/716 | 362/580 |
| 2012/0168122 A1* | 7/2012 | Skepnek | H01L 23/367 | 165/80.2 |
| 2012/0196477 A1* | 8/2012 | Nichols | H01R 13/518 | 439/607.01 |
| 2012/0231662 A1* | 9/2012 | Tsou | H01R 43/18 | 439/607.55 |
| 2012/0254495 A1* | 10/2012 | Tang | H04L 49/40 | 710/316 |
| 2012/0322308 A1* | 12/2012 | Fogg | H01R 13/6477 | 439/607.25 |
| 2012/0329325 A1* | 12/2012 | Fogg | H01R 13/6477 | 439/607.25 |
| 2013/0033821 A1* | 2/2013 | Szczesny | H05K 9/0009 | 361/704 |
| 2013/0034993 A1* | 2/2013 | Szczesny | H01R 13/6587 | 439/607.17 |
| 2013/0077254 A1* | 3/2013 | Nguyen | G02B 6/4261 | 361/715 |
| 2013/0186681 A1* | 7/2013 | Wickes | H01R 13/6583 | 174/382 |
| 2013/0251052 A1* | 9/2013 | Tang | H04L 25/03878 | 375/259 |
| 2014/0017949 A1* | 1/2014 | Schmitt | H01R 24/76 | 439/629 |
| 2014/0080352 A1* | 3/2014 | Xue | G02B 6/4261 | 439/487 |
| 2014/0148059 A1* | 5/2014 | Long | G02B 6/0001 | 439/626 |
| 2014/0153192 A1* | 6/2014 | Neer | G02B 6/4277 | 361/704 |
| 2014/0202755 A1* | 7/2014 | Ito | H05K 9/0018 | 174/359 |
| 2014/0363171 A1* | 12/2014 | Tang | H04B 10/40 | 398/135 |
| 2015/0072561 A1* | 3/2015 | Schmitt | H01R 13/6581 | 439/607.55 |
| 2015/0171558 A1* | 6/2015 | Yu | H01R 12/58 | 439/607.01 |
| 2015/0180168 A1* | 6/2015 | Han | H01R 13/506 | 439/353 |
| 2015/0214686 A1* | 7/2015 | Khazen | H01R 13/65802 | 29/453 |
| 2015/0280368 A1* | 10/2015 | Bucher | H01R 13/665 | 439/487 |
| 2015/0364850 A1* | 12/2015 | Yang | H01R 13/659 | 439/607.25 |
| 2016/0062065 A1* | 3/2016 | Wu | G02B 6/4269 | 385/89 |
| 2016/0064873 A1* | 3/2016 | Bucher | H01R 12/7076 | 385/88 |
| 2016/0149324 A1* | 5/2016 | Regnier | H01R 12/721 | 439/76.1 |
| 2016/0211620 A1* | 7/2016 | Sharf | H01R 12/724 | |
| 2016/0342563 A1* | 11/2016 | Tomada | G06F 13/4027 | |
| 2017/0005446 A1* | 1/2017 | Regnier | H01R 12/7005 | |
| 2017/0097484 A1* | 4/2017 | Teo | G02B 6/4284 | |
| 2018/0166827 A1* | 6/2018 | Little | G02B 6/4293 | |
| 2018/0212385 A1* | 7/2018 | Little | H01R 13/504 | |

* cited by examiner

ELECTRICAL ADAPTOR FOR DIFFERENT PLUG MODULE AND ELECTRICAL ASSEMBLY HAVING THE SAME

BACKGROUND OF THE INVENTION

1. Field of the Invention

The present invention relates to an electrical connector assembly, especially to the terminal layout and the terminal module assembly thereof and the so-called FP5 connector following the previous designs of which the provisional applications have a Ser. No. 62/367,098 filed on Jul. 26, 2016, a Ser. No. 62/399,272 filed on Sep. 23, 2016, and a Ser. No. 62/412,841 filed on Oct. 26, 2016. The structures of the invention may be referenced to the similar structures disclosed in those applications.

2. Description of Related Art

Currently QSFP-DD Specification Rev. 0.1 discloses a 1x1 QSFP-DD module has eight electrical lanes. Each of the eight electrical lanes of the QSFP runs at the rate of 25 Gbit/s or 50 Gbit/s, thereby the QSFP-DD module support 200 Gbit/s or 400 Gbit/s Ethernet applications of. The QSFP-DD module has an electrical receptacle. The electrical receptacle has an insulative housing and four rows of electrical terminals received in the insulative housing. Each of the electrical terminals has a soldering section. Two rows soldering sections of the two top rows of the electrical terminals are offset in a longitudinal direction from two rows soldering sections of the two bottom rows of the electrical terminals.

U.S. Pat. No. 7,798,820, issued on Sep. 21, 2010, discloses an optical transceiver module including an edge connector and a female host connector. The female host connector includes a row of first terminals having first contact sections, a row of second terminals having second contact sections, a row of third terminals having third contact sections and a row of the fourth terminal having fourth contact sections. The first contact section forwardly extends beyond the second contact section. The fourth terminal is in front of the third terminal. The edge connector includes a mating circuit board, the mating circuit board defines a number of contact pads on top of board and bottom of board. The contact pads includes a row of first pads and a row of second pads on the top of board, a row of third of pads and a row of fourth pads on the bottom of board. The first contact section connects with the first pad, the second contact section connects with the second pad, the third contact section connects with the third pad, and the fourth contact section connects with the fourth pad.

U.S. Pat. No. 8,727,793, issued on May 20, 2014, discloses a small SFP board with an end portion configured to be insert into a connector device. The SFP board has a first set of signal pads and a fourth set of signal pads on top surface, a second set of signal pads and a third set of signal pads on bottom surface. The fourth set of signal pads are offset in a longitudinal direction from the first set signal pads on the top surface. The third set of signal pads are offset in a longitudinal direction from the second set signal pads on the bottom surface.

The invention is to provide an FP5 to QSFP-28 adaptor to allow the QSFP-28 module to be mated with FP5 cage.

SUMMARY OF THE INVENTION

An electrical assembly includes a main body on which the cage assembly and the associated main receptacle connector are mounted. The cage is adapted to receive the FP5 plug module or the QSFP-28 plug module associated with an adaptor. The adaptor includes a housing unitarily formed with the heat sink structure and an intermediate receptacle connector mounted upon an intermediate board wherein the intermediate receptacle connector is adapted to receive the QSFP-28 plug module and the intermediate board is adapted to be received with the main board. The cage includes different latches respectively mutually exclusively locking the FP5 plug module and the QSFP-28 plug module.

Other objects, advantages and novel features of the invention will become more apparent from the following detailed description when taken in conjunction with the accompanying drawings.

DETAILED DESCRIPTION OF THE PREFERRED EMBODIMENT

Figure 1:
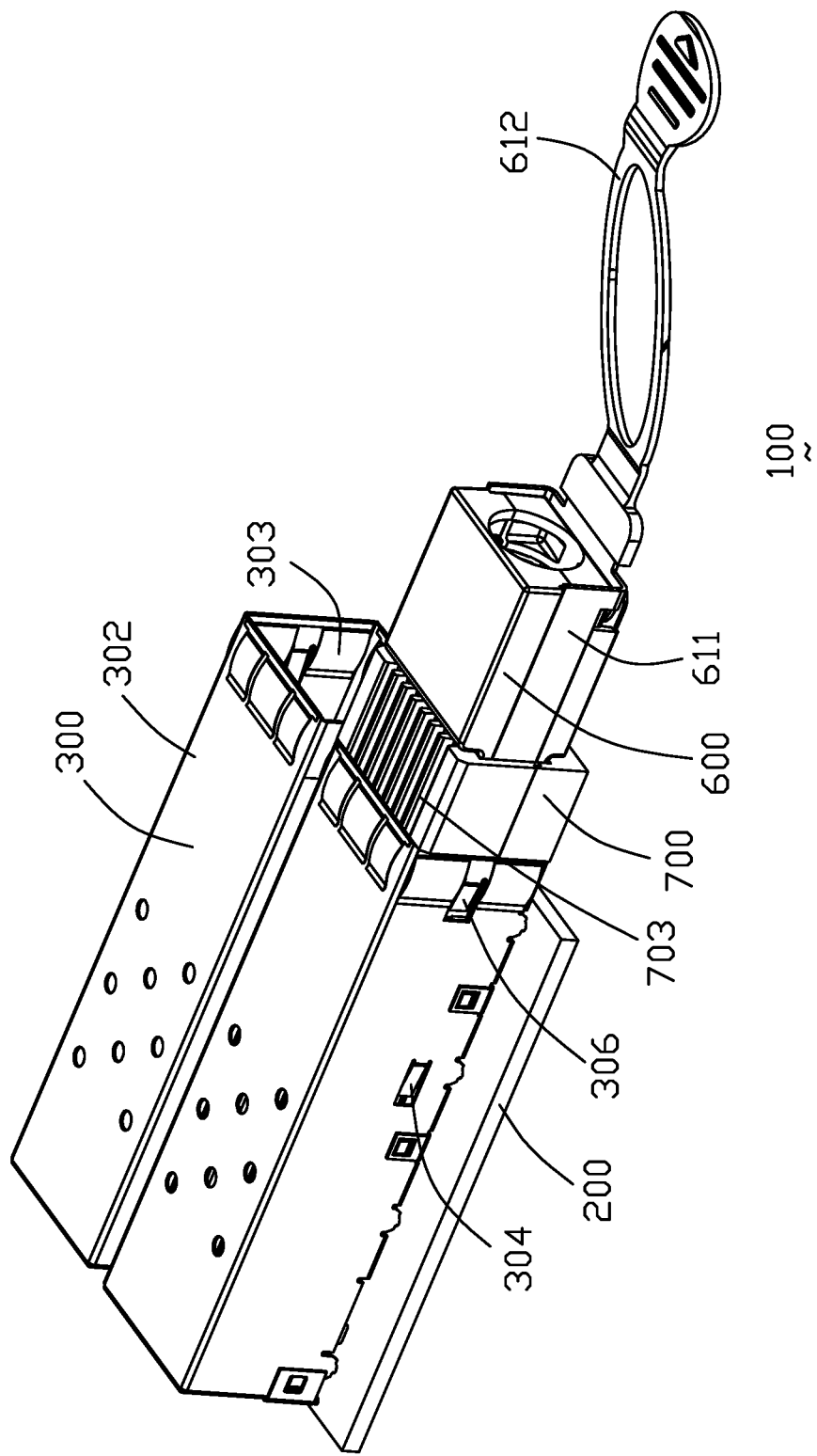
FIG. 1 is a perspective view of an electrical assembly including a cage assembly and the QSFP-28 plug module assembled therein via an adaptor.
Figure 2:
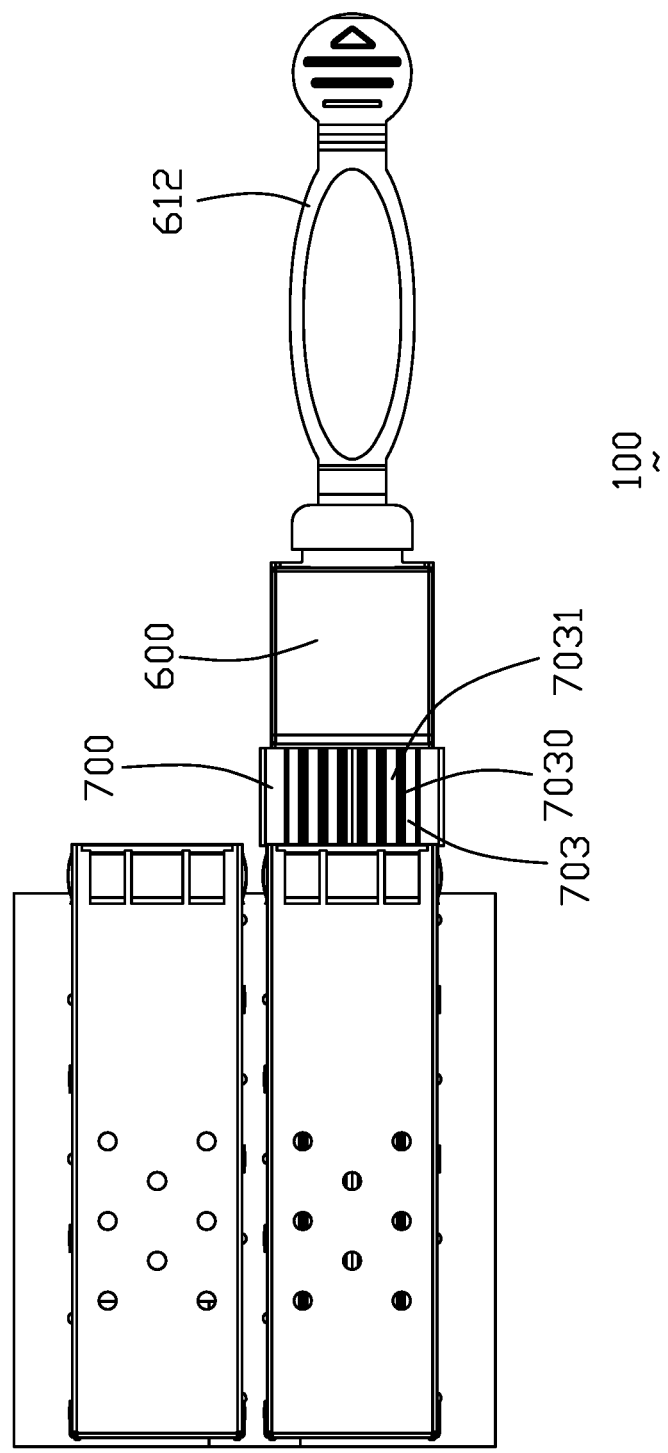
FIG. 2 is a top view of the electrical assembly of FIG. 1.
Figure 3:
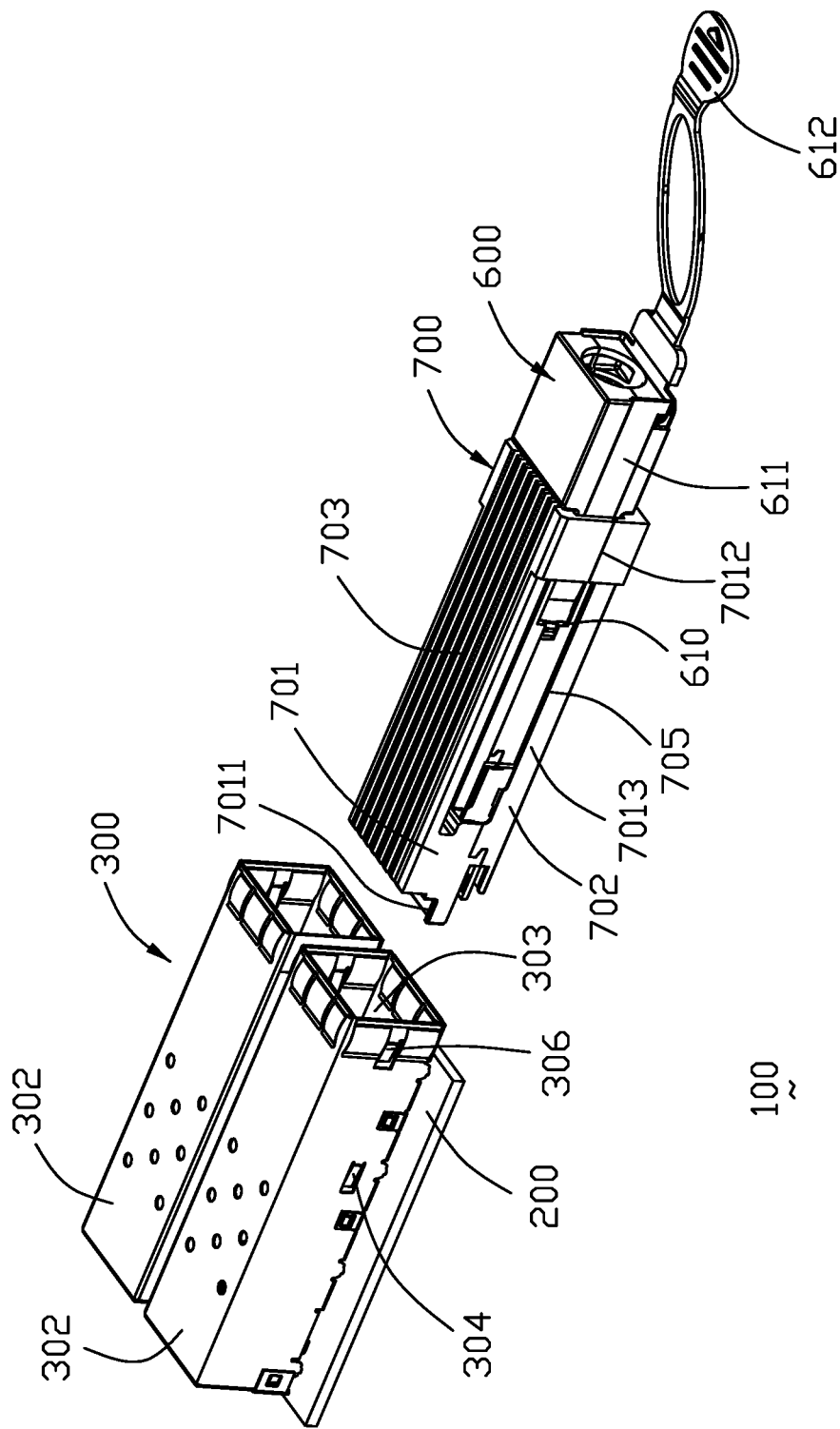
FIG. 3 is an exploded perspective view of the electrical assembly of FIG. 1 where the QSFP-28 plug module and the associated adaptor are withdrawn from the cage assembly thereof.
Figure 3A:
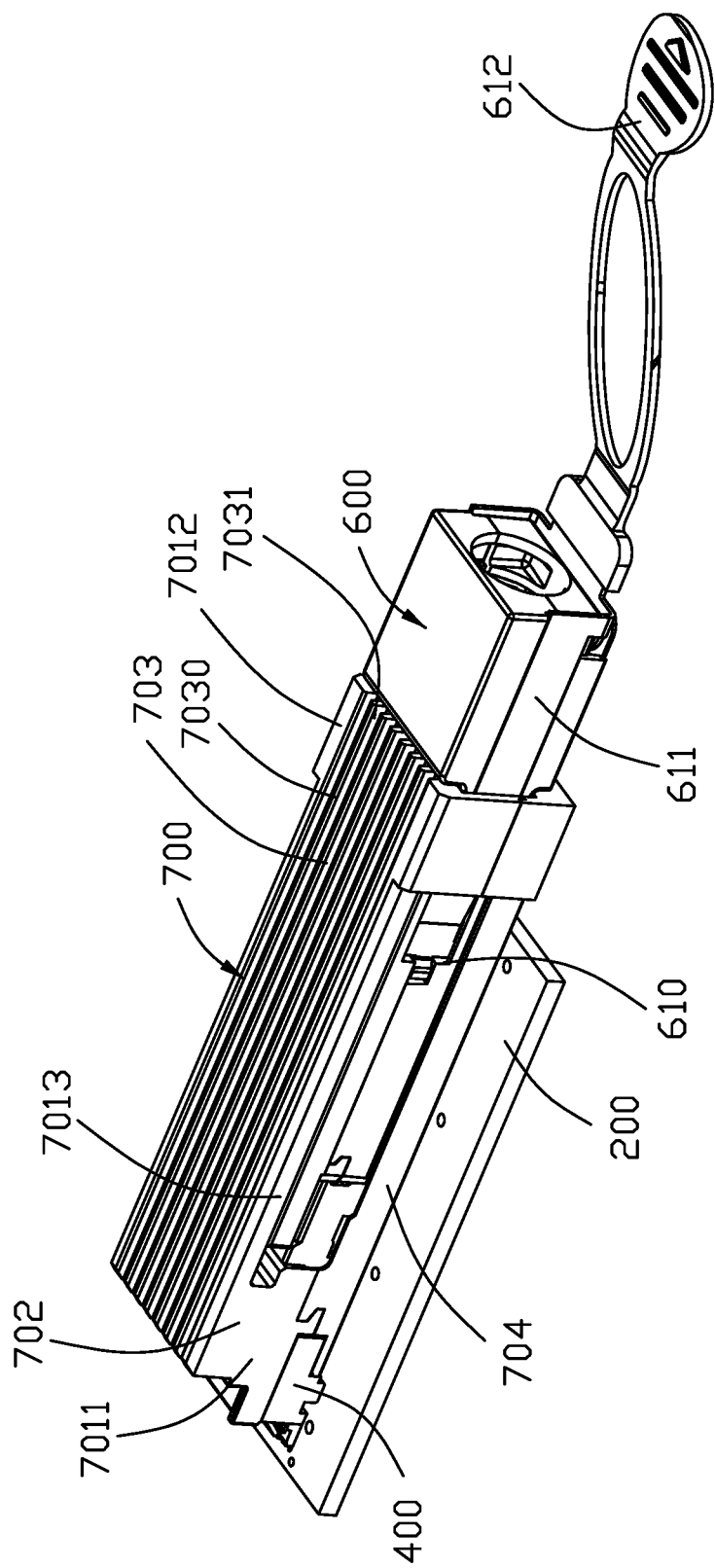
FIG. 3(A) is a perspective view of the electrical assembly of FIG. 1 wherein the QSFP-28 plug module and the associated adaptor and the corresponding main board on which the main receptacle connector mounted (with the cage assembly removed)
Figure 4A:
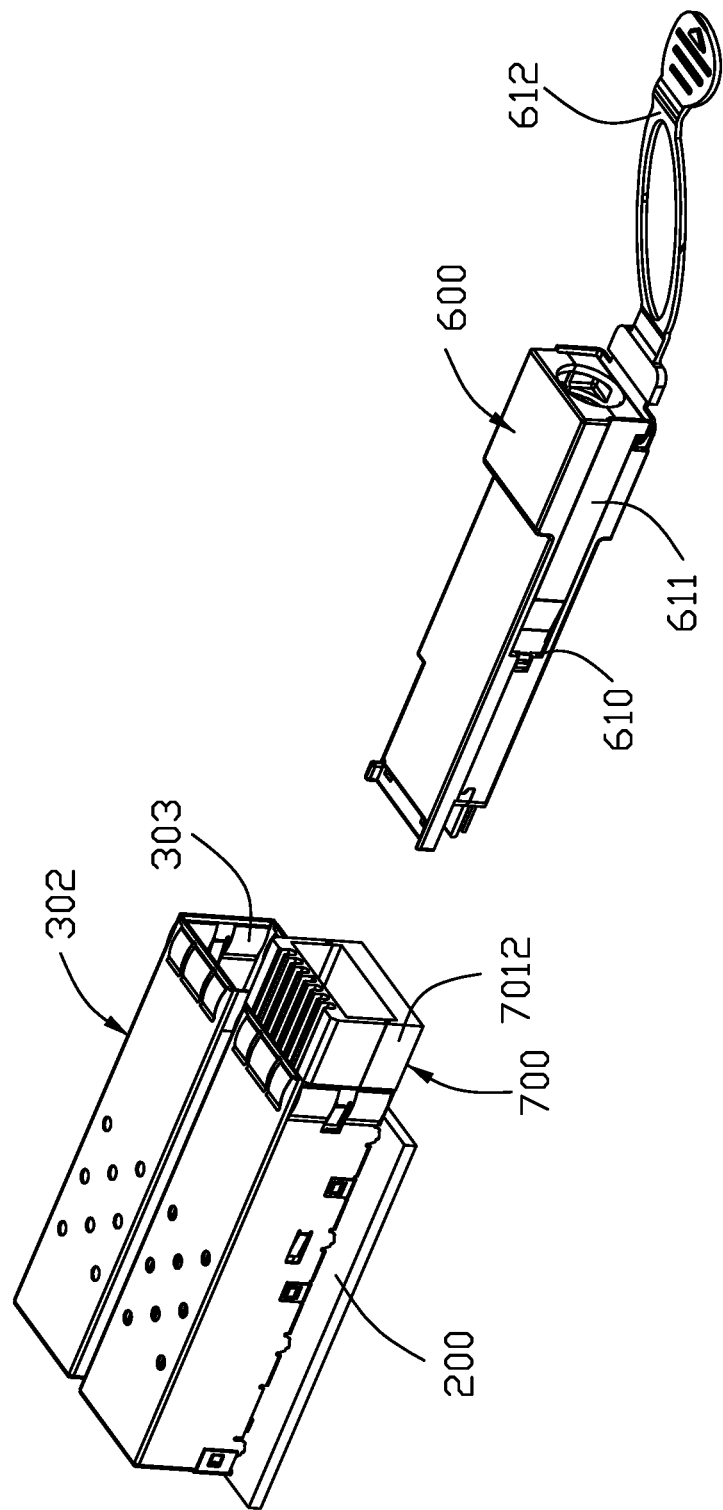
FIG. 4(A) is an exploded perspective view of the electrical assembly of FIG. 1 wherein the QSFP-28 plug module is withdrawn from the adaptor.
Figure 4B:
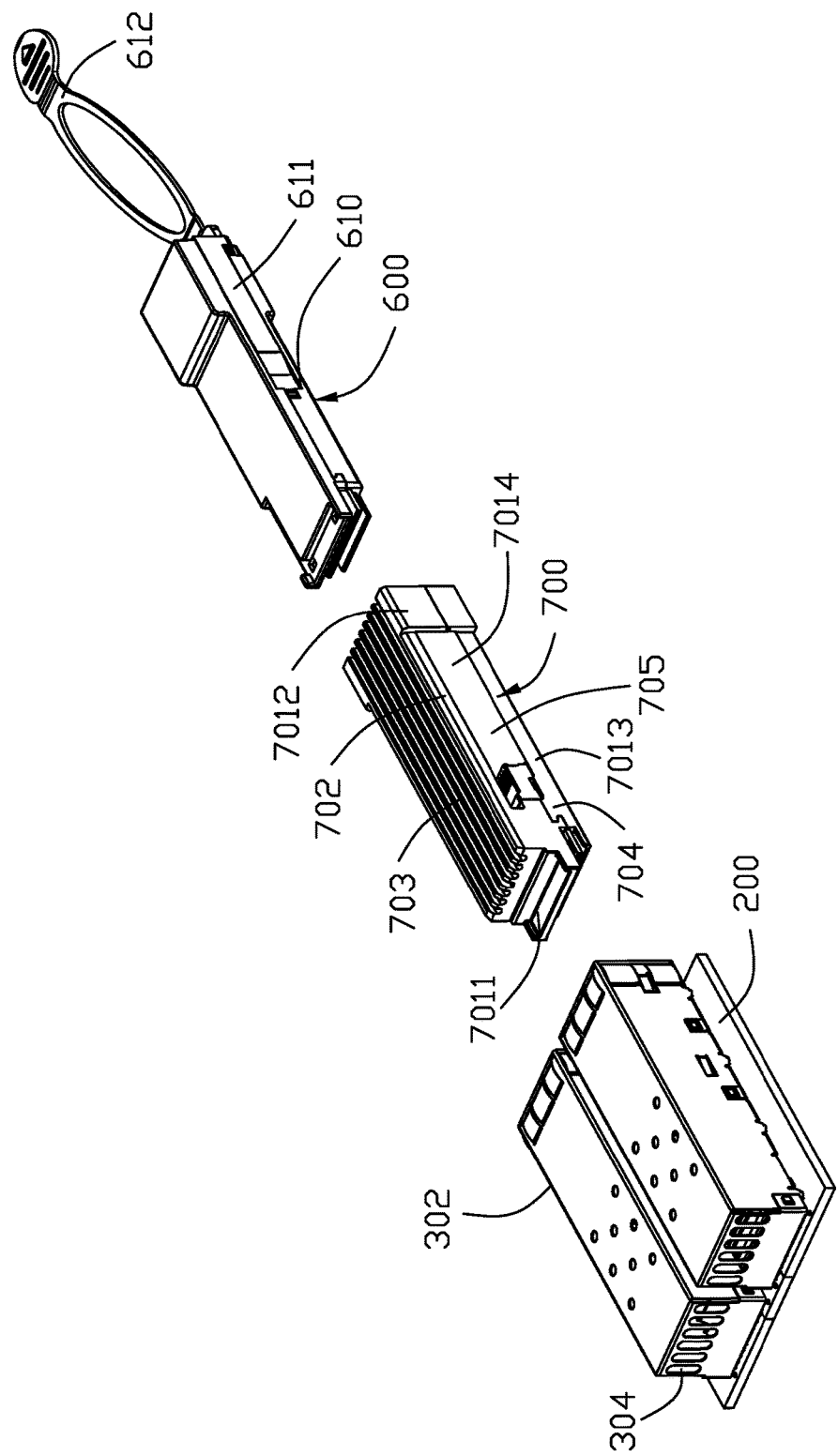
FIG. 4(B) is an exploded perspective view of the electrical assembly of FIG. 4(A) wherein the adaptor is further withdrawn from the cage assembly.
Figure 5:
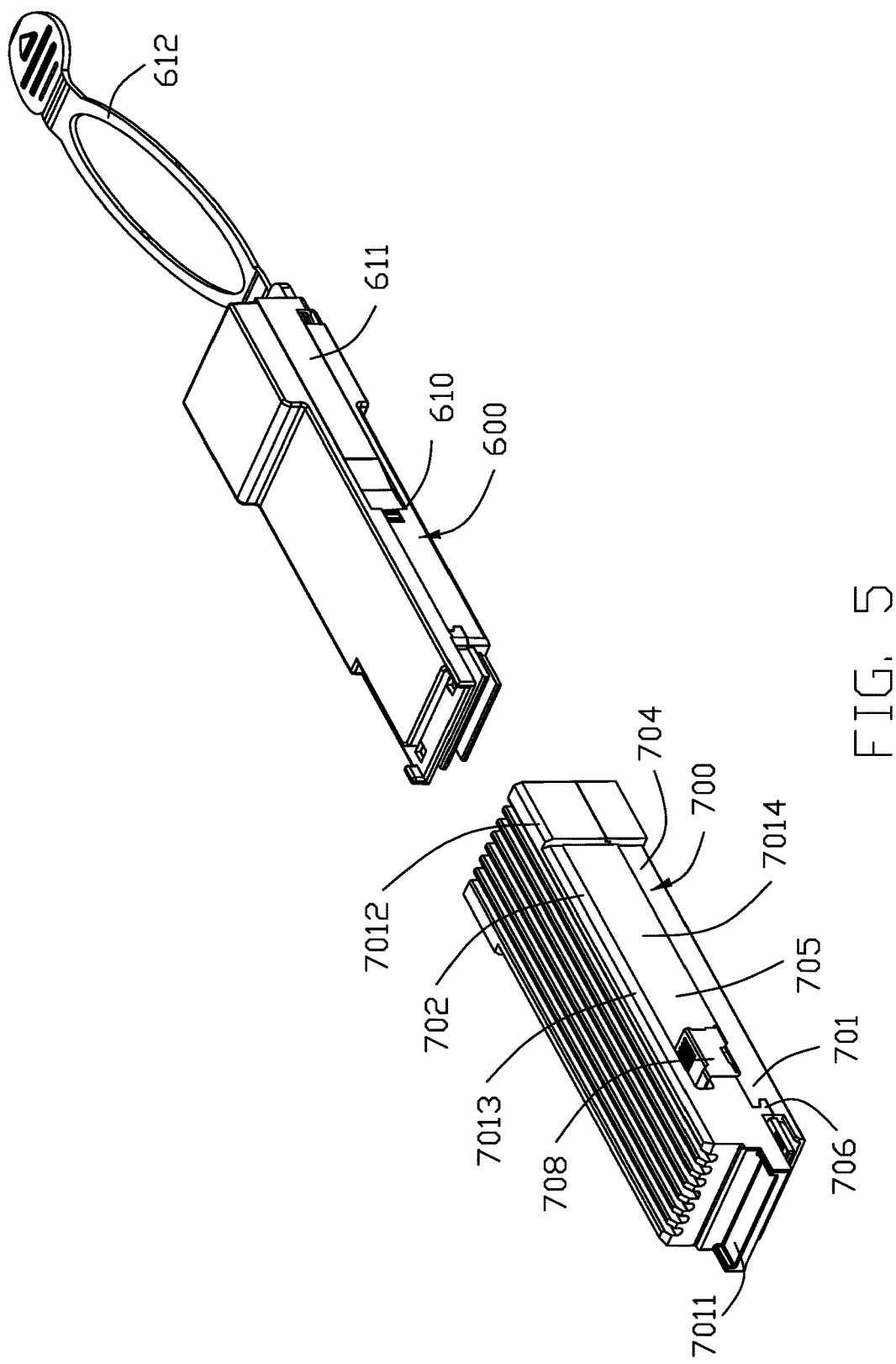
FIG. 5 is a perspective view of the QSFP-28 plug module and the adaptor of FIG. 4(A)
Figure 6:
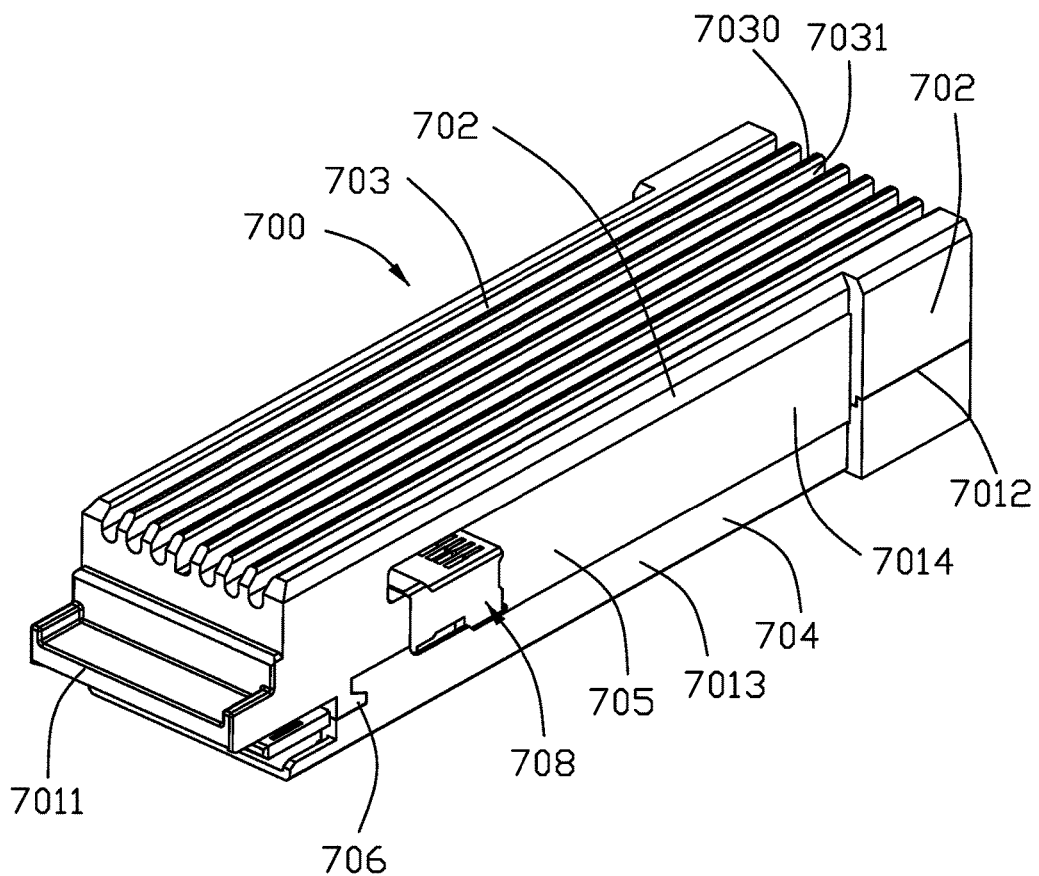
FIG. 6 is a perspective view of the adaptor of FIG. 5.
Figure 6A:
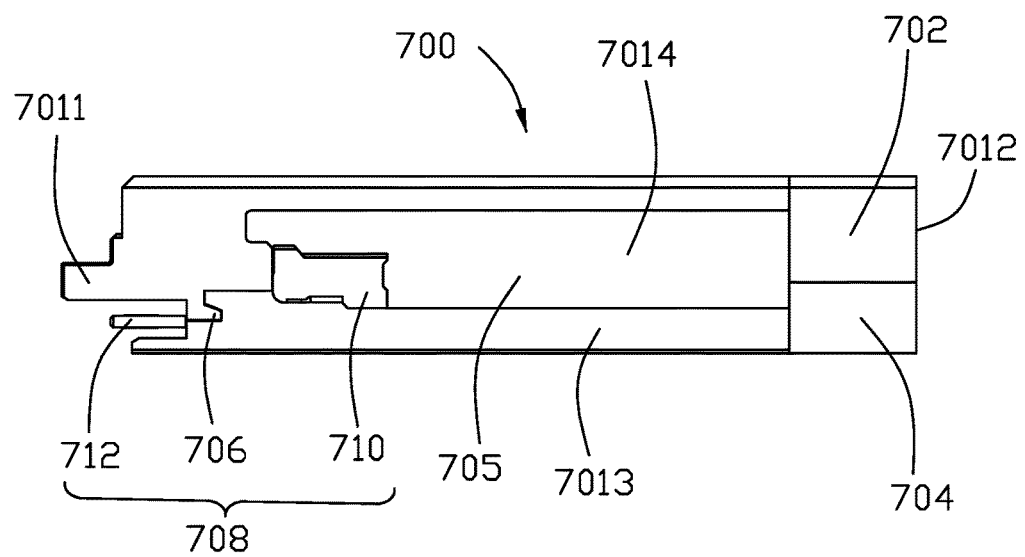
FIG. 6(A) is a side view of the adaptor of FIG. 6.
Figure 7A:
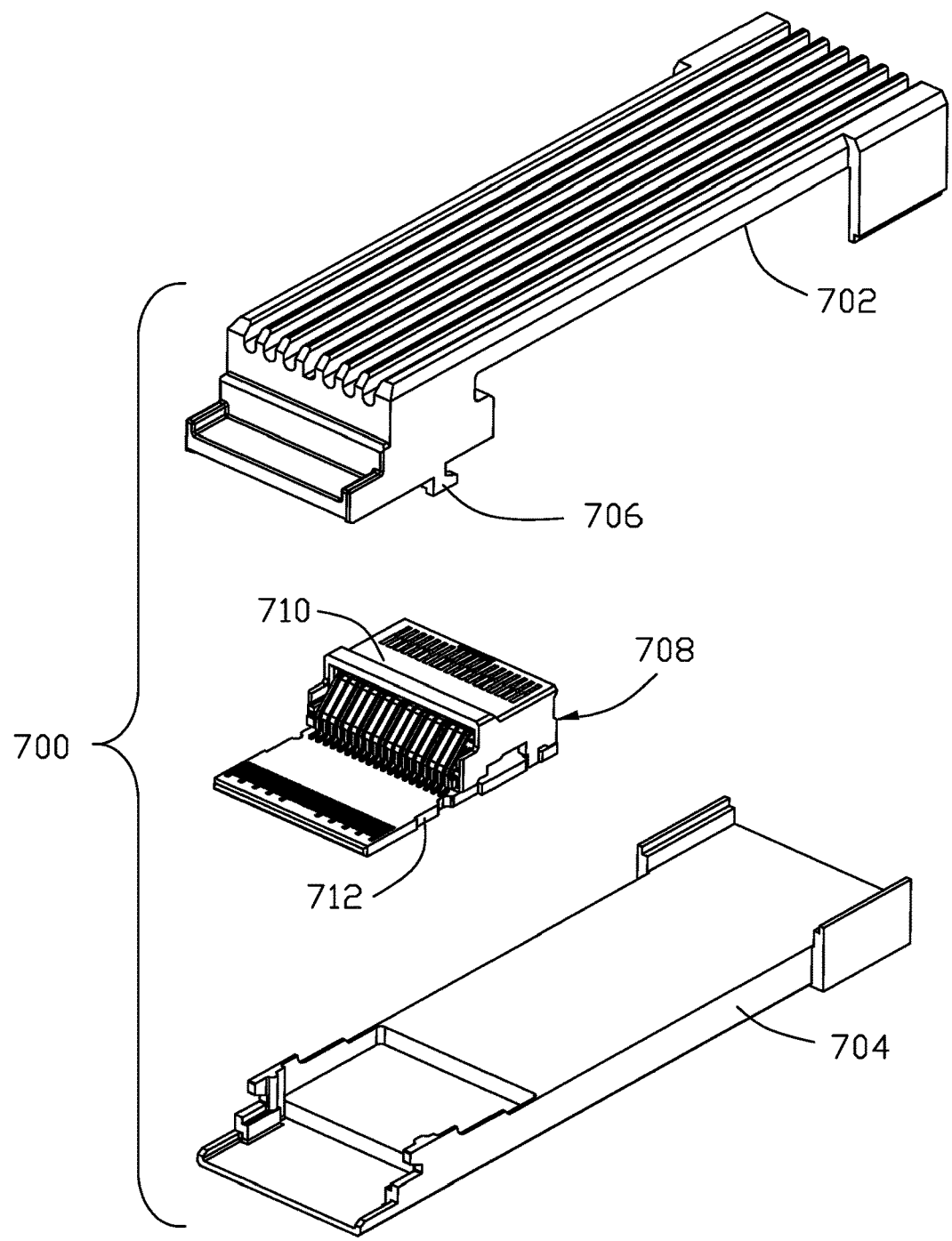
FIG. 7(A) is an exploded perspective view of the adaptor of FIG. 6.
Figure 7B:
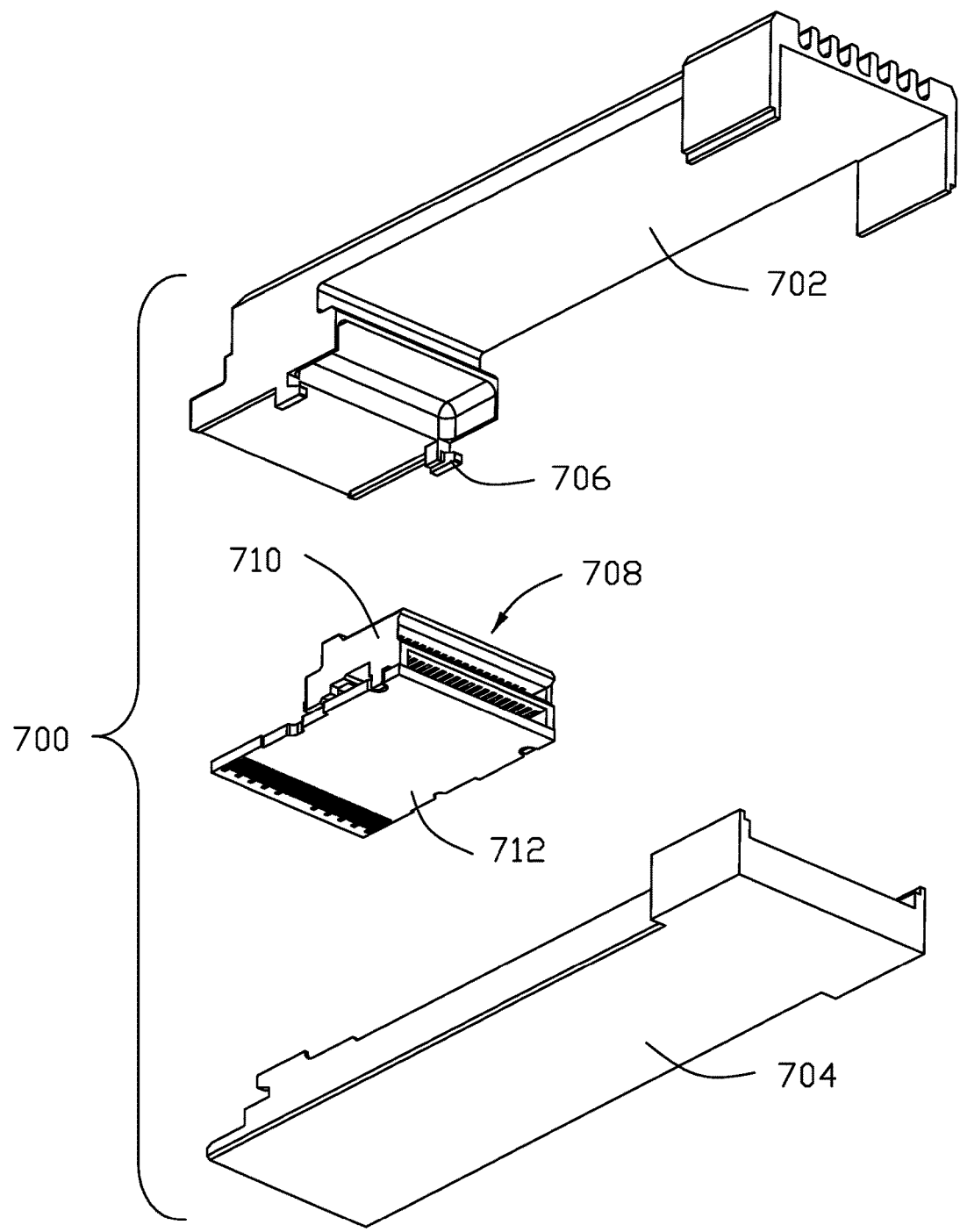
FIG. 7(B) is another exploded perspective view of the adaptor of FIG. 7(A)
Figure 8:
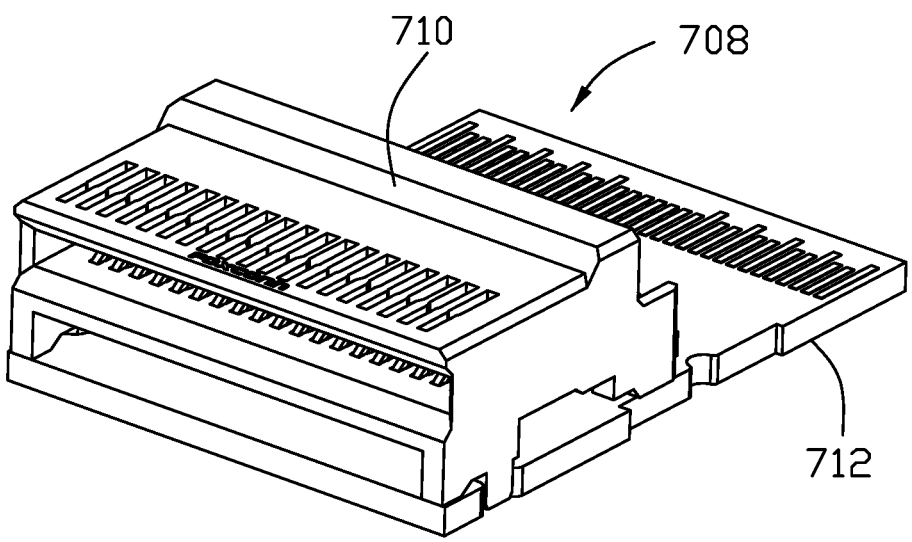
FIG. 8 is a receptacle unit of the adaptor of FIG. 7(A)
Figure 9:
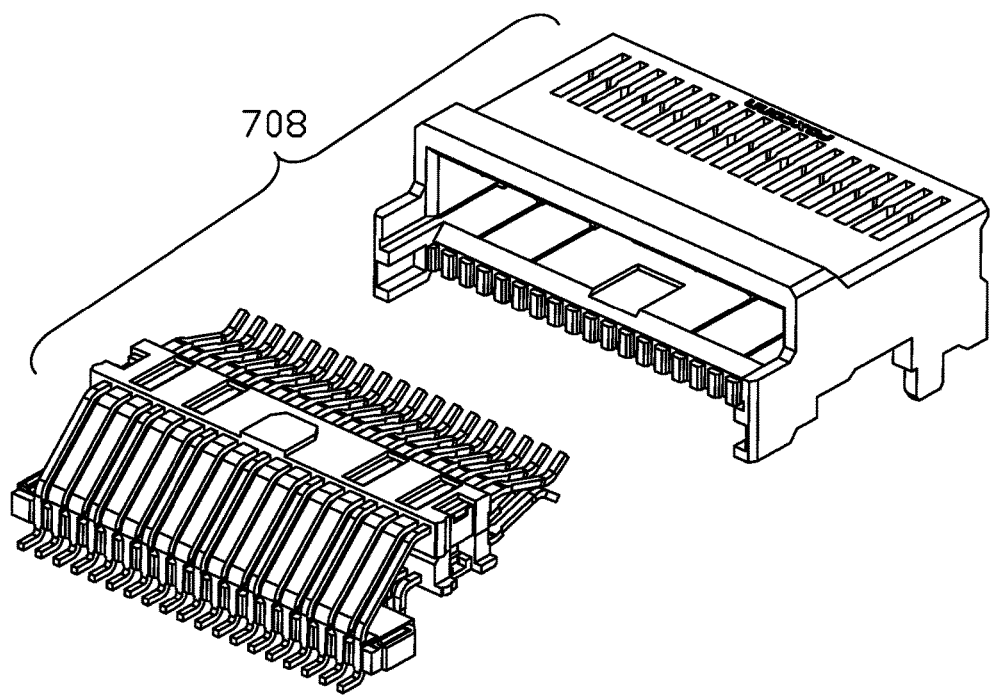
FIG. 9 is the intermediate receptacle of the receptacle unit of the adaptor of FIG. 8.
Figure 10:
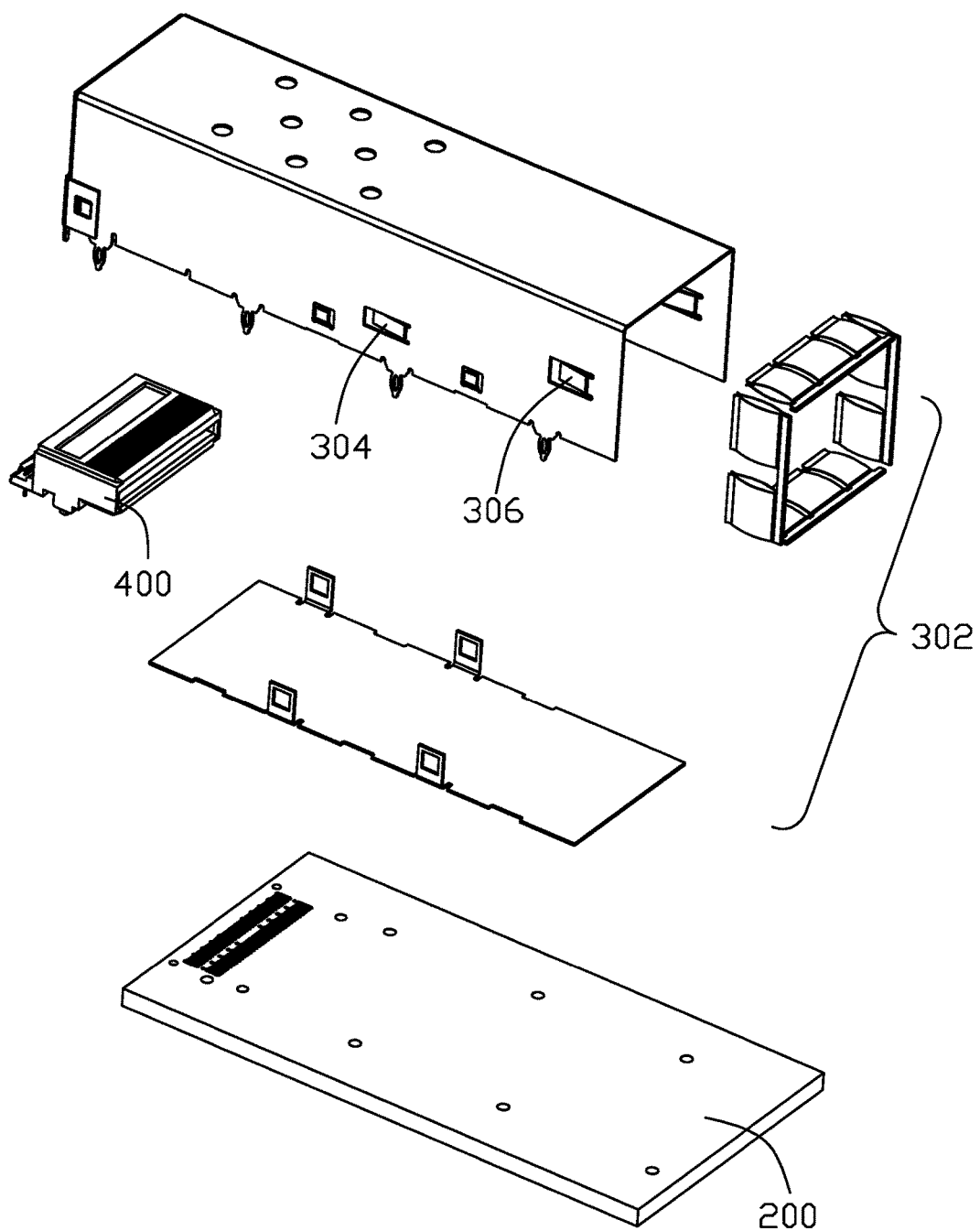
FIG. 10 is an exploded perspective view of the cage and the main receptacle connector both mounted upon the main board.
Figure 11:
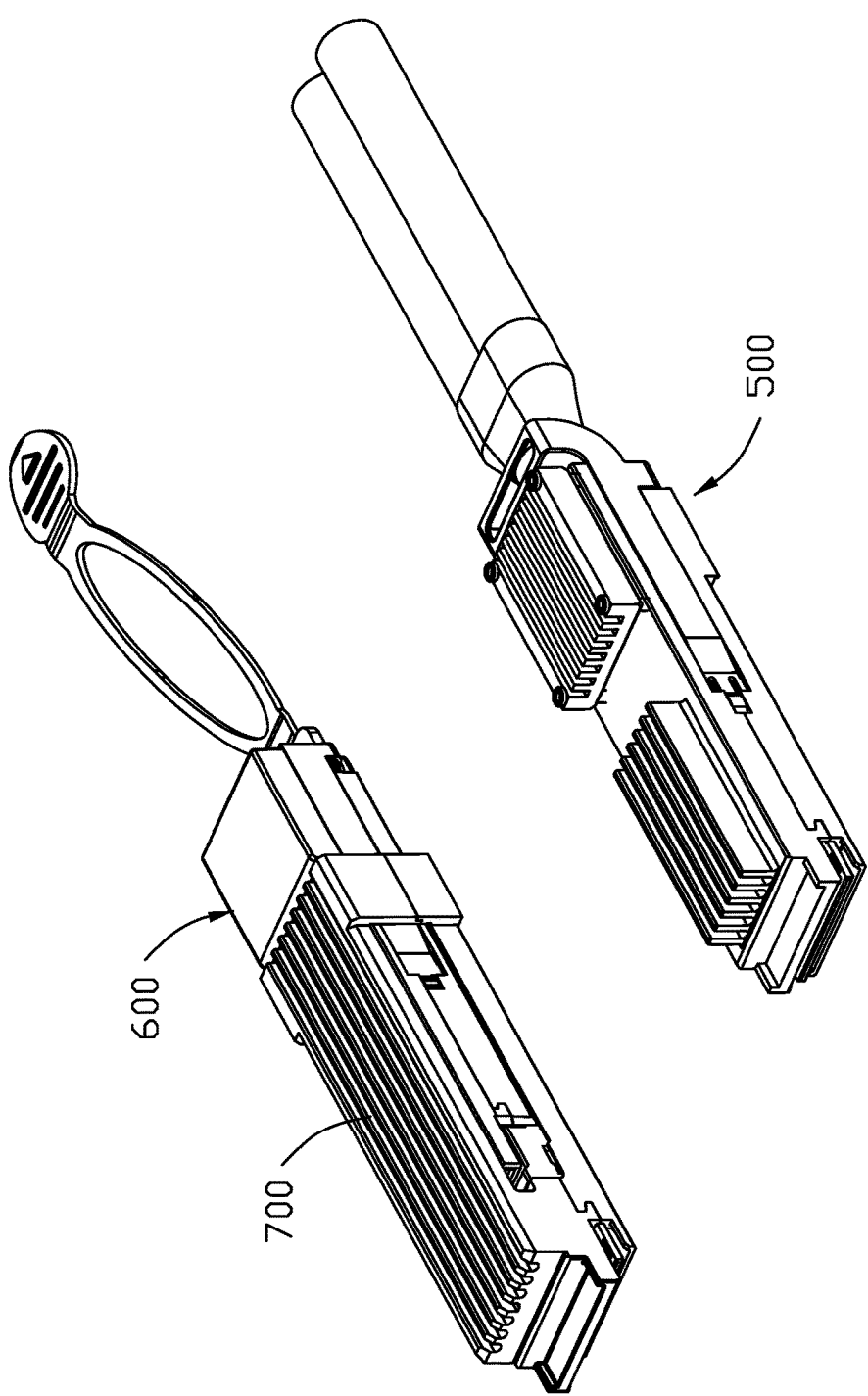
FIG. 11 shows the QSFP-28 plug module received in the adaptor, and the FP5 plug module.
Figure 12:
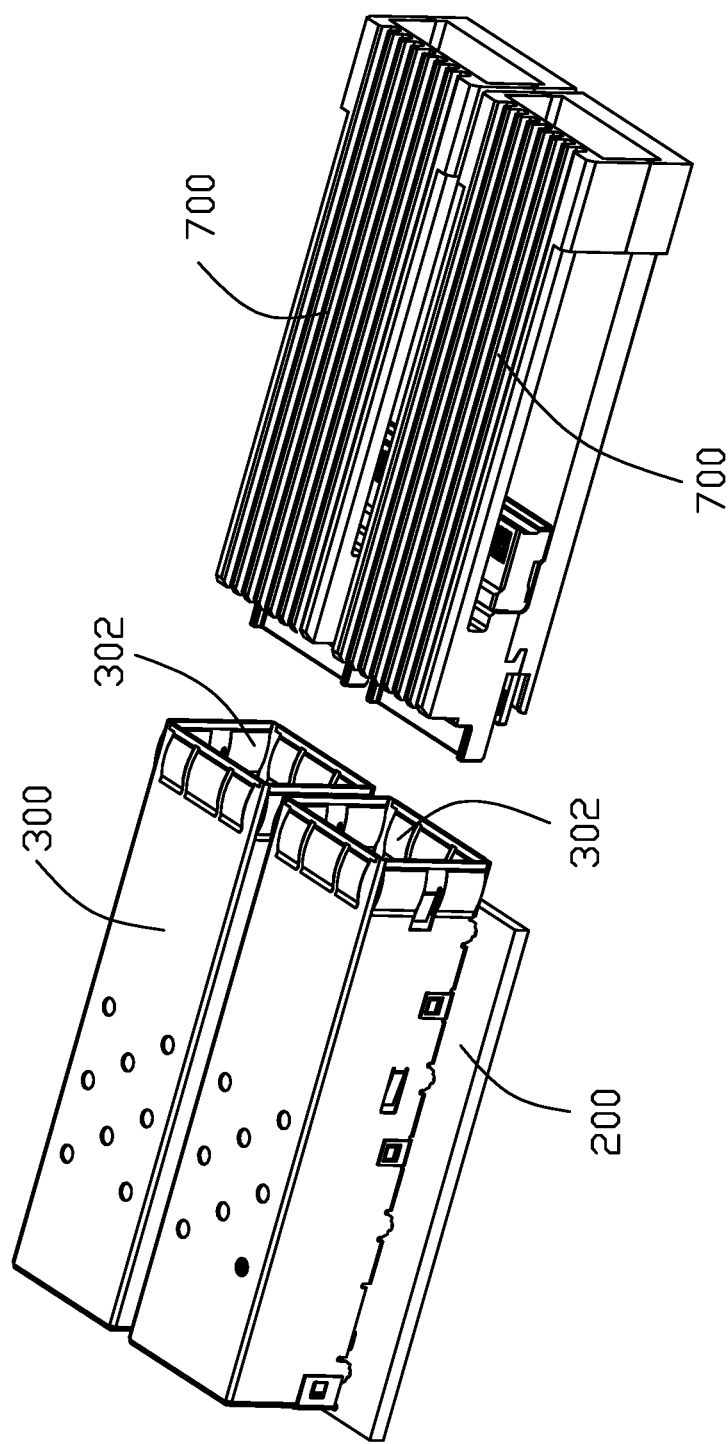
FIG. 12 is a perspective view of an electrical assembly including the cage assembly and a pair of adaptors.
Figure 13:
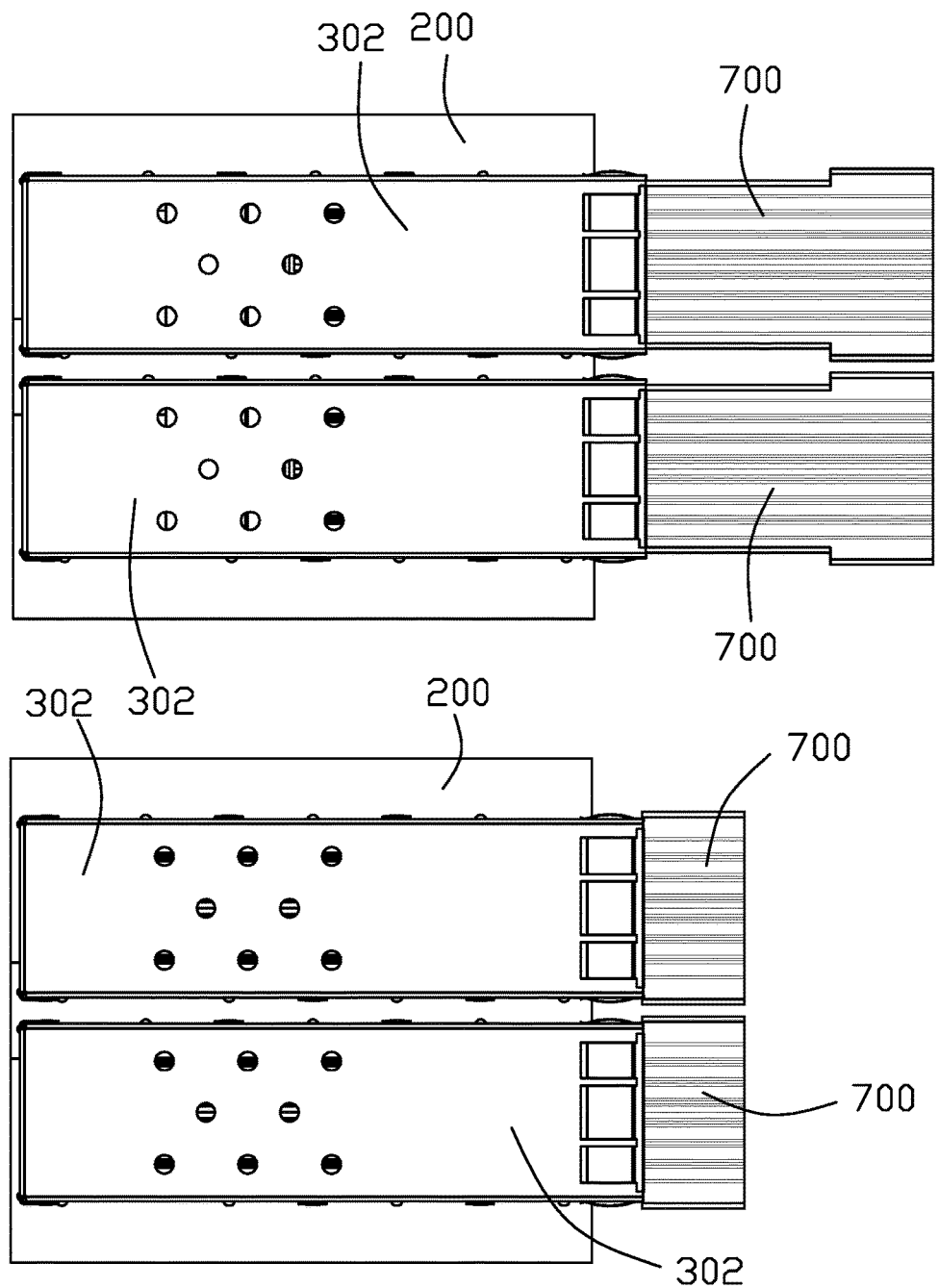
FIG. 13 is a top view of the electrical assembly respectively showing the pair of the adaptors partly inserted into the cage assembly and fully received into the cage assembly of FIG. 12.
Figure 14:
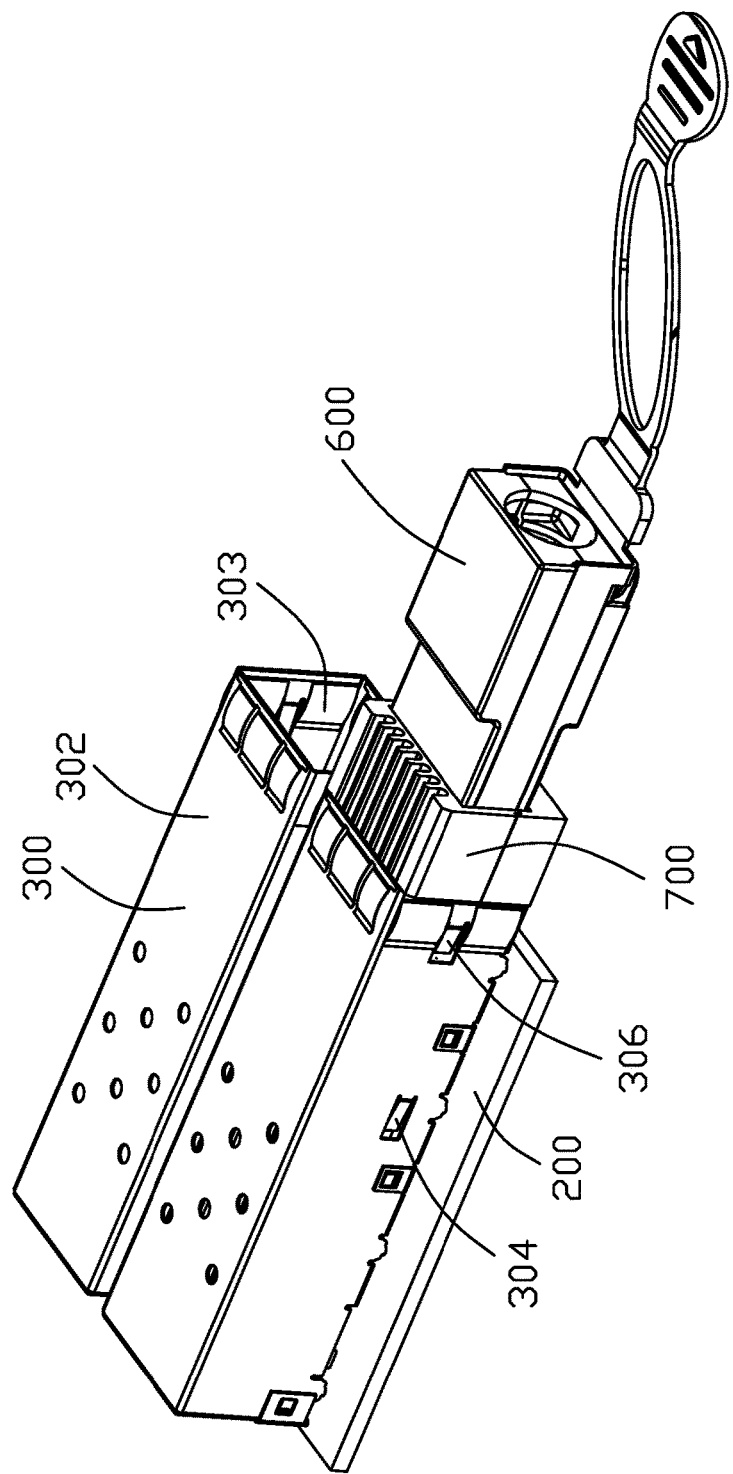
FIG. 14 is a perspective view of the electrical assembly showing the QSFP-28 plug module partly inserter into the adaptor of FIG. 1.
Figure 15:
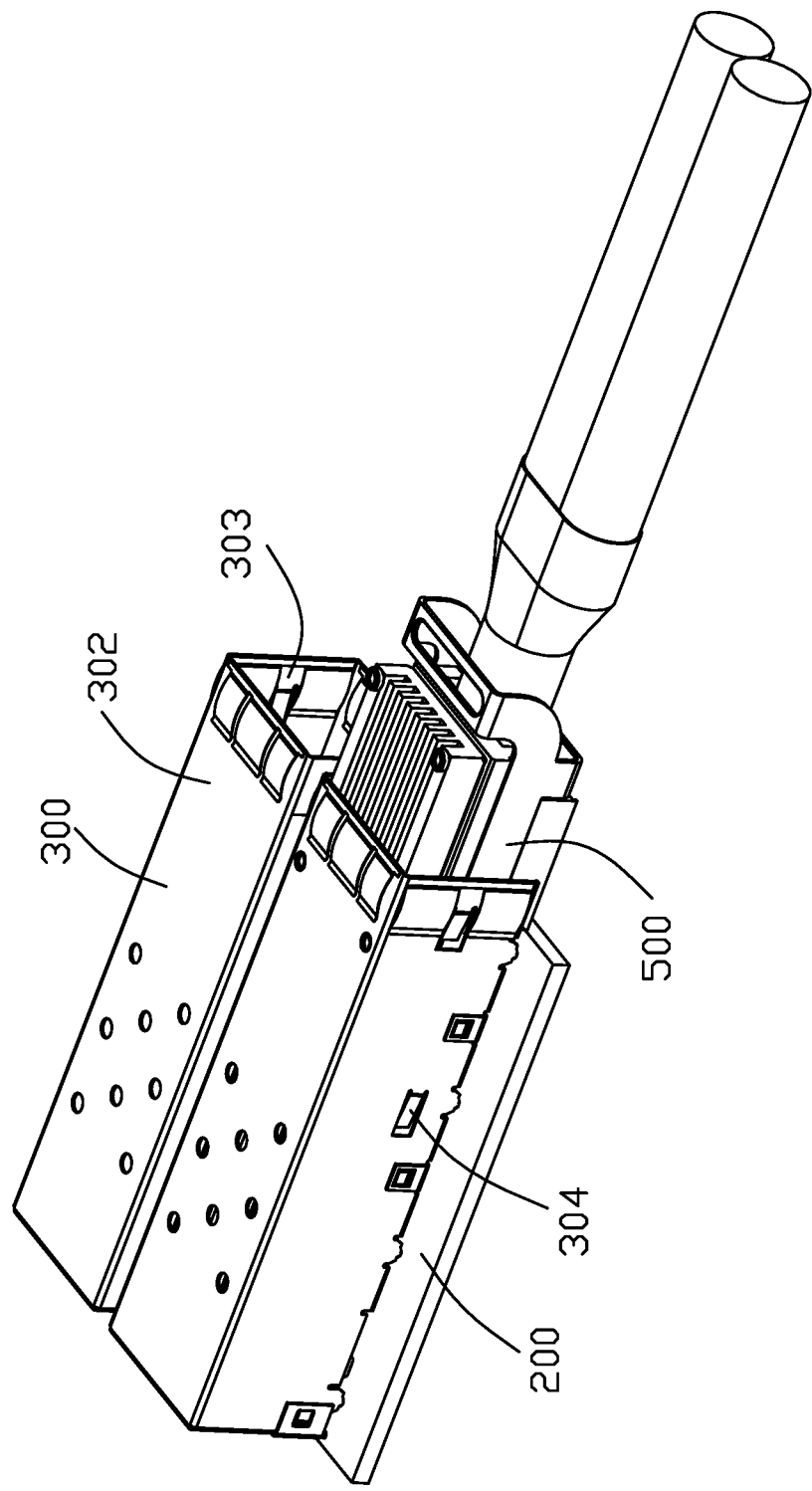
FIG. 15 is a perspective view of an electrical assembly including a FP5 plug inserted into the cage assembly of FIG. 1.

Referring to FIG. 1-15, the electrical assembly 100 includes a main board 200 on which a cage assembly 300 and a main receptacle connector 400 are mounted. The cage assembly 300 includes a pair of cages 302 each defined a receiving space 303 and equipped with a main receptacle connector or main connector 400 at a rear end of the receiving space 303. Each of the receiving space 303 has a size and a length adapted to receive the FP5 plug module 500, or a QSFP-28 plug module 600 with the associated adaptor 700. The cages 302 are formed by metallic material.

The adaptor 700 includes a housing 701 having an upper housing 702 and a lower housing 704 assembled to each other with latches 706 to commonly sandwich and enclosing a receptacle connector unit 708 therebetween. The housing 701 comprises a first end 7011 for mating with a cage assembly 300, an opposite second end mating end 7012 for the QSFP-28 plug module 600 being inserted into, and body portion 7013 having a receiving room 7014 disposed therebetween for receiving the QSFP-28 plug module 600. The mating end 7011 has a width larger than the first end 7011 and the body portion 7013 of the housing 701. The body of the housing 701 forms two opposite lateral openings 705 in communication with the receiving room 7014. The receptacle connector unit 708 is located on the first end 7011 and includes an intermediate receptacle connector or intermediate connector 710 mounted upon an intermediate board 712 wherein the intermediate board 712 is adapted to be mated with or received within the main receptacle connector 400, and the intermediate receptacle connector 710 is adapted to be mated with the QSFP-28 plug module 600. The intermediate connector 710 is surface mounted on the intermediate board 712. The upper housing 702 is unitarily formed with the heat sink structure 703. The hest sink 703 comprises a plurality of ribs 7030 and a plurality of slots 7031 formed between two adjacent ribs 7030. In other words, the combination of the QSFP-28 plug module 600 and the adaptor 700 is somewhat equivalent to the FP5 plug module 500 from some viewpoint wherein the pitch of the FP5 plug module 500 is different from that of the QSFP-28 plug module 600.

The cage 302 includes a rear lock or a first latch 304 for locking the FP5 plug module 500 but not working with the adaptor 700, and a front lock or a second latch 306 for locking the QSFP-28 plug module 600 while not working with the FP5 plug module 500. The front lock 306 extends through the lateral openings 705 to directly locked or latched with the QSFP-28 plug module 600. The rear lock 304 and the front lock 306 are offset in a mating direction of the adaptor, and also offset in a vertical direction. In other words, the adaptor 700 provide not only the electrical connection between the QSFP-28 plug module 600 with the main receptacle connector 400, but also function as an interposer/spacer to occupy the required space for retaining the associated QSFP-28 plug module 500 in position with regard to the cage 302 without forward movement so as to assure locking between the QSFP-28 plug module 500 and the cage 302. Notably, because the housing 701 forms lateral openings 705 on two lateral sides to expose the corresponding lateral engagement/disengagement section 610 of the QSFP-28 plug module 600 for locking/unlocking with the front lock 304 in response to the actuator 611 linked by the pull ring 612. The cage 302 defines a plurality of through holes 304 in communication with the slots 7031 to establish air flow channels for heat sinking It is to be understood, however, that even though numerous characteristics and advantages of the present invention have been set fourth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the members in which the appended claims are expressed.

What is claimed is:

1. An electrical assembly comprising:
    a metallic cage defining a receiving space for receiving a first type plug module;
    a main connector located at a rear end of the receiving space; and
    an adaptor including an intermediate connector associated with an intermediate board; wherein
    the intermediate board is adapted to be mated with the main connector, and the intermediate connector is adapted to be mated with a second type plug module;
    said adaptor includes a housing enclosing said intermediate connector and said intermediate board;
    the housing comprises an upper housing and a lower housing assembled to each other to commonly sandwich said intermediate connector and said intermediate board therebetween; and
    the housing comprise a heat sink located on the upper housing.

2. The electrical assembly as claimed in claim 1, said adaptor forms two opposite lateral openings.

3. The electrical assembly as claimed in claim 1, wherein the cage is directly latchable with the second type plug module.

4. The electrical assembly as claimed in claim 1, wherein the cage comprises a first latch for being latched with the first type plug module, and a second latch for being latched with the second type plug module.

5. The electrical assembly as claimed in claim 4, wherein the first latch and the second latch are offset in a mating direction of the adaptor, and also offset in a vertical direction.

6. The electrical assembly as claimed in claim 1, wherein the heat sink is unitarily formed on the upper housing.

7. The electrical assembly as claimed in claim 1, wherein the heat sink comprises a plurality of ribs and a plurality of slots formed between every two adjacent ribs.

8. The electrical assembly as claimed in claim 7, wherein the cage defines a plurality of through holes in communication with the slots to establish air flow channels for heat sinking.

9. The electrical assembly as claimed in claim 1, wherein the housing comprises a mating end opposite to an end of the intermediate connector and the intermediate board, the mating end has a width larger than other portion of the housing.

10. The electrical assembly as claimed in claim 1, wherein the intermediate connector is surface mounted on the intermediate board.

11. An adaptor, comprising:
    a housing having a first end for mating with a cage assembly, an opposite second end for a plug module inserted into, and a body portion having a receiving room disposed therebetween for receiving the plug module; and
    a connector unit received in the housing and located on the first end; wherein said connector unit comprises a printed circuit board for mating with the cage assembly, and a connector mounted on the printed circuit board for receiving the plug module; and
    the housing defines at least one opening for the plug module to directly latch with the cage assembly.

12. The adaptor as claimed in claim 11, wherein the housing comprises an upper housing and a lower housing assembled to each other to commonly sandwich said connector unit therebetween.

13. An electrical connector assembly comprising:
a metallic cage forming a receiving space and a main receptacle connector at a rear end for receiving either directly a first type plug module which has a board type mating section directly received within the main receptacle connector, or indirectly a second type plug module through an adaptor wherein the adaptor has an intermediate board with a board type mating section received within the receptacle connector and an intermediate receptacle connector mounted upon the intermediate board for receiving a board type mating section of the second type plug module; wherein
the cage forms a first lock for engagement with a latch of the first type plug module, and a second lock for engagement with an other latch of the second type plug module, said first lock being spaced from the second lock in a front-to-back direction.

14. The electrical connector assembly as claimed in claim 13, wherein the adaptor includes a housing enclosing the second type plug module.

15. The electrical connector assembly as claimed in claim 14, wherein the second lock is located behind the first lock in the front-to-back direction.

16. The electrical connector assembly as claimed in claim 14, wherein a heat sink structure is formed upon the housing.

17. The electrical connector assembly as claimed in claim 14, wherein the board type mating section of the intermediate board extends forwardly beyond the housing.

\* \* \* \* \*